United States Patent
Hasegawa

(10) Patent No.: US 9,365,071 B2
(45) Date of Patent: *Jun. 14, 2016

(54) PAGE-TURNING DEVICE AND DOCUMENT CAMERA SYSTEM

(71) Applicant: CASIO COMPUTER CO., LTD., Shibuya-ku, Tokyo (JP)

(72) Inventor: Hirokazu Hasegawa, Koganei (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/710,126

(22) Filed: May 12, 2015

(65) Prior Publication Data

US 2015/0239277 A1    Aug. 27, 2015

Related U.S. Application Data

(62) Division of application No. 14/019,425, filed on Sep. 5, 2013, now Pat. No. 9,056,516.

(30) Foreign Application Priority Data

Sep. 20, 2012 (JP) ................................ 2012-207003

(51) Int. Cl.
*H04N 1/04* (2006.01)
*B42D 9/04* (2006.01)
*H04N 5/232* (2006.01)

(52) U.S. Cl.
CPC .. *B42D 9/04* (2013.01); *H04N 1/04* (2013.01); *H04N 5/232* (2013.01)

(58) Field of Classification Search
CPC ......... H04N 1/04; H04N 5/232; H04N 1/193; H04N 1/1012; H04N 1/12
See application file for complete search history.

(56) References Cited

U.S. PATENT DOCUMENTS 4,685,374 A    8/1987   Goldner
4,936,034 A    6/1990   Chen et al.
(Continued)

FOREIGN PATENT DOCUMENTS

CN    2195441 Y    4/1995
JP    52003644 U   1/1977
(Continued)

OTHER PUBLICATIONS

Chinese Office Action dated Jan. 21, 2015, issued in counterpart Chinese Application No. 201310429718.8.
(Continued)

*Primary Examiner* — Cheukfan Lee
(74) *Attorney, Agent, or Firm* — Holtz, Holtz & Volek PC

(57) ABSTRACT

A page-turning device turning a page of a book includes a sticking part, an arm part and a drive unit. The sticking part sticks to the page of the book being opened. The arm part is provided with the sticking part on a top end and swings such that the sticking part sticks to the page at a departure position of the page and separates from the page at a destination position of the page while the sticking part goes to and fro between the departure position and the destination position over the page of the book. The drive unit swings the arm part around a drive shaft of the drive unit. The drive shaft is inclined with respect to a seam of the opened book and/or a plane on which the book is disposed.

17 Claims, 11 Drawing Sheets

(56) References Cited

U.S. PATENT DOCUMENTS

| | | | |
|---|---|---|---|
| 5,049,033 | A | 9/1991 | Corsmeier et al. |
| 6,049,033 | A * | 4/2000 | Dallas ............................ 84/486 |
| 6,574,014 | B2 | 6/2003 | Mandel et al. |
| 7,259,312 | B2 * | 8/2007 | Jakes ............................ 84/486 |
| 2003/0063334 | A1 | 4/2003 | Mandel et al. |
| 2003/0063335 | A1 | 4/2003 | Mandel et al. |
| 2005/0230592 | A1 * | 10/2005 | Tillinghast et al. ........ 248/441.1 |
| 2008/0316551 | A1 * | 12/2008 | Taylor et al. .................. 358/498 |
| 2010/0296138 | A1 | 11/2010 | Jakes et al. |
| 2014/0059903 | A1 | 3/2014 | Li et al. |
| 2014/0078561 | A1 | 3/2014 | Hasegawa |
| 2014/0168726 | A1 | 6/2014 | Hasegawa |
| 2014/0366412 | A1 | 12/2014 | Hasegawa |
| 2015/0174942 | A1 | 6/2015 | Hasegawa |
| 2015/0375557 | A1 | 12/2015 | Hasegawa |

FOREIGN PATENT DOCUMENTS

| | | |
|---|---|---|
| JP | 05013780 U | 2/1993 |
| JP | 07089260 A | 4/1995 |
| JP | 10137045 A | 5/1998 |
| JP | 2003320769 A | 11/2003 |
| JP | 2010253893 A | 11/2010 |
| JP | 2014061620 A | 4/2014 |

OTHER PUBLICATIONS

Japanese Office Action (and English translation thereof) dated Feb. 2, 2016, issued in counterpart Japanese Application No. 2012-207003.

* cited by examiner

PORTION WITH WEAKENED ADHESIVE POWER

PUT BACK

PAGE-TURNING DEVICE AND DOCUMENT CAMERA SYSTEM

CROSS REFERENCE TO RELATED APPLICATION

This application is a Divisional application of U.S. Ser. No. 14/019,425, which is based upon and claims the benefit of priority under 35 USC 119 of Japanese Patent Application No. 2012-207003 filed on Sep. 20, 2012, the entire disclosure of which, including the description, claims, drawings and abstract, is incorporated herein by reference in its entirety.

BACKGROUND OF THE INVENTION

1. Field of the Invention

The present invention relates to a page-turning device and a document camera system.

2. Description of Related Art

Conventionally, as an automatic page-turning device to turn pages of a book or the like, there is known a page-turning device in which a separation mechanism for separating piled pages from each other and a turning mechanism for turning the separated pages are operated individually, which is disclosed, for example, in Japanese Patent Application Laid-Open Publication No. H07-89260.

SUMMARY OF THE INVENTION

There has been desire for a higher-speed page-turning device as is the case with other electronic devices. In the aforementioned page-turning device, the separation mechanism and the turning mechanism are operated at different timings, which interferes with increase in speed.

Hence, objects of the present invention include speeding up page-turning by separating a page of a book from another and turning the separated page thereof in one operation.

In order to achieve at least one of the objects, according to a first aspect of the present invention, there is provided a page-turning device turning a page of a book including: a sticking part which sticks to the page of the book being opened; an arm part with the sticking part provided on a top end, the arm part swinging such that the sticking part sticks to the page at a departure position of the page and separates from the page at a destination position of the page while the sticking part goes to and fro between the departure position and the destination position over the page of the book; and a drive unit which swings the arm part around a drive shaft of the drive unit, wherein the drive shaft is inclined with respect to a seam of the opened book and/or a plane on which the book is disposed.

In order to achieve at least one of the objects, according to a second aspect of the present invention, there is provided a document camera system including: the page-turning device; and an image pickup unit which picks up an image of the page of the book.

BRIEF DESCRIPTION OF THE DRAWINGS

The present invention will become more fully understood from the detailed description given hereinafter and the appended drawings, which are given byway of illustration only and thus are not intended as a definition of the limits of the present invention, wherein:

FIG. 4A, FIG. 4B and FIG. 4C schematically illustrate how inclination of a drive shaft of a first drive unit according to the embodiment affects a page-turning operation, wherein FIG. 4A illustrates a case where a drive shaft 32 is horizontally disposed on the extension of a seam b2 of pages P, FIG. 4B illustrates a case where the drive shaft 32 is horizontal and inclined such that the back end of the drive shaft 32 turns to right-hand side with respect to the seam b2 of the pages P and the front end of the drive shaft 32 as the base end turns to left-hand side with respect to the seam b2 of the pages P, and FIG. 4C illustrates a case where the drive shaft 32 is inclined with respect to the seam b2 of the pages P and is also inclined with respect to the horizontal plane, i.e. a case of the drive shaft 32 according to the embodiment.

DETAILED DESCRIPTION OF THE PREFERRED EMBODIMENT

Hereinafter, an embodiment of the present invention will be described with reference to the drawings. Though various technical limitations which are preferable to carry out the present invention are added to the after-described embodiment, the scope of the invention is not limited to the following embodiment and the illustrated examples.

Figure 1:
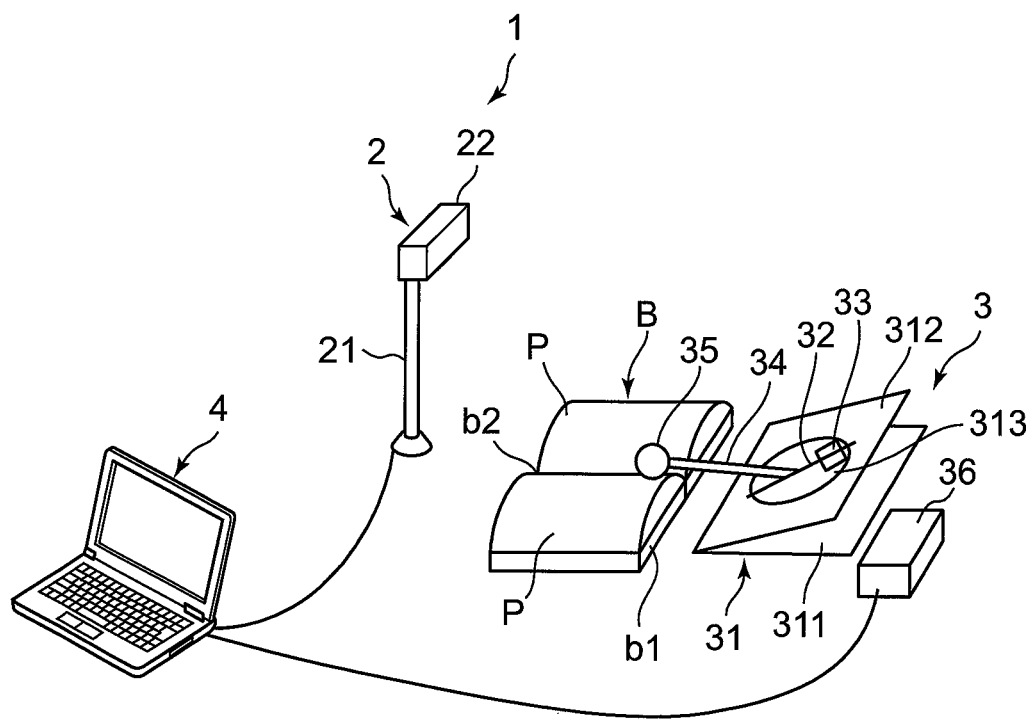
FIG. 1 is a perspective view schematically showing the configuration of a document camera system according to an embodiment of the present invention.
Figure 2A:
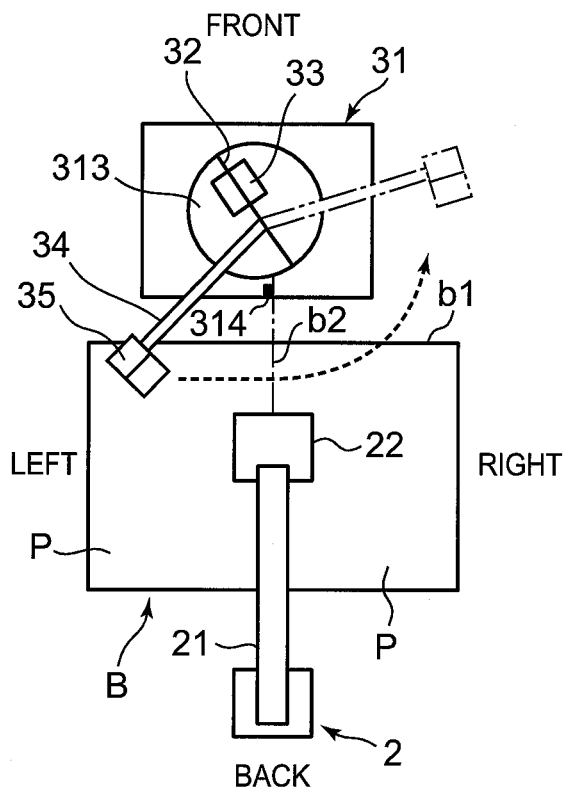
FIG. 2A is a top view showing the configuration of the essential part of the document camera system in FIG. 1.
Figure 2B:
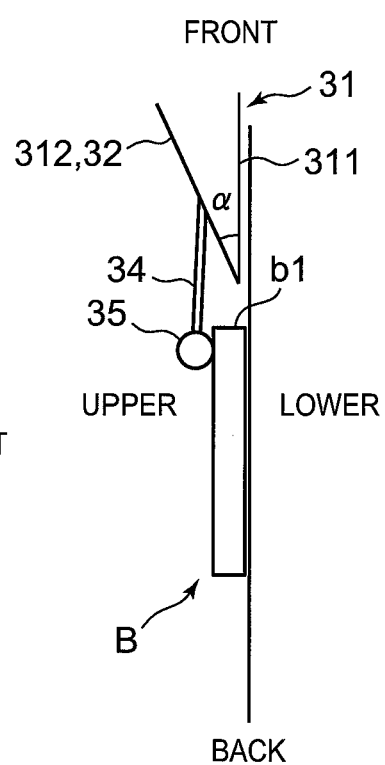
FIG. 2B is a side view showing the configuration of the essential part of the document camera system in FIG. 1.

FIG. 1 is a perspective view schematically showing the configuration of a document camera system according to an embodiment of the present invention. FIG. 2A and FIG. 2B illustrate the configuration of the essential part of the document camera system, wherein FIG. 2A is a top view, and FIG. 2B is a side view. In the explanation hereinafter, pages P of a book B are turned from left to right.

As shown in FIG. 1, FIG. 2A and FIG. 2B, a document camera system 1 includes: a document camera 2 as an image pickup unit which picks up images of the pages P of the book B; a page-turning device 3 which turns the pages P of the book B; and a personal computer 4 connected to the document camera 2 and the page-turning device 3 such that the computer 4 can communicate with the document camera 2 and the page-turning device 3.

The document camera 2 includes a stand part 21 and a camera 22 attached to the upper end of the stand part 21. The stand part 21 is inclinable in the front-back direction and the left-right direction, and extensible in the up-down direction, so that a positional relationship of the book B and the camera 22 can be adjusted. A lens of the camera 22 faces downward such that the book B comes within an angle of view. A position-adjustment mechanism is disposed at the joining portion of the camera 22 and the stand part 21, so that the facing direction of the lens of the camera 22 can be adjusted.

The page-turning device 3 includes: a base 31; a first drive unit (drive unit) 33, such as a motor, disposed on the base 31 and having a drive shaft 32; an arm part 34 which swings around the drive shaft 32; a sticking part 35 attached to the top end of the arm part 34, the sticking part 35 sticking to a page P of the book B; and a control unit 36 which controls these parts and the like of the page-turning device 3.

The base 31 is disposed, for example, on a desk such that one side of the base 31 is parallel to the upper side b1 of the book B opened on the desk. In the explanation hereinafter, "back" is defined as a side where the book B is disposed, i.e. the book B side, and "front" is defined as a side where the base 31 is disposed, i.e. the base 31 side. The seam b2 of the book B is along the front-back direction. The base 31 includes a main base 311 and a sub base 312 which is superposed on the main base 311 and can adjust an angle α between the main base 311 and the sub base 312. On the back end (the end on the book B side) of the subbase 312, a hinge (not shown) is disposed. This hinge makes the angle α between the sub base 312 and the main base 311 adjustable. The sub base 312 is provided with a rotating plate 313 which is rotatable and supports the first drive unit 33. The drive shaft 32 of the first drive unit 33 is disposed parallel to the upper surface of the rotating plate 313.

When the pages P of the book B are turned from left to right, the angle of the rotating plate 313 is determined such that the back end (the end on the book B side) of the drive shaft 32 turns to right-hand side with respect to the seam b2 of the pages P and the front end (the end on a side opposite to the book B side) of the drive shaft 32 as the base end turns to left-hand side with respect to the seam b2 of the pages P. On the other hand, when the pages P of the book B are turned from right to left, the angle of the rotating plate 313 is determined such that the back end (the end on the book B side) of the drive shaft 32 turns to left-hand side with respect to the seam b2 of the pages P and the front end (the end on the side opposite to the book B side) of the drive shaft 32 turns to right-hand side with respect to the seam b2 of the pages P.

Whichever the turning direction is, the drive shaft 32 is inclined such that the base end of the drive shaft 32 is on a side where a departure position of the pages P exists (departure position side) with respect to the seam b2 of the book B and also inclined at the angle α with respect to a plane on which the book B is put (horizontal plane).

Also, a mark 314 for locating is formed at the back end (the end on the book B side) of the sub base 312. It is preferable to locate the base 31 such that this mark 314 is on the extension of the seam b2.

The arm part 34 is inclined with respect to the drive shaft 32 toward the book B side. As the drive shaft 32 rotates, the arm part 34 goes to and fro (shuttle operation) between the departure position and a destination position of the pages P as if the arm part 34 draws a circular arc around the drive shaft 32. That is to say, the drive shaft 32 is a symmetry axis of swing of the arm part 34. In the explanation hereinafter, a movement from the departure position to the destination position of the pages P is referred to as an outward movement (a motion of going), and a movement from the destination position to the departure position is referred to as a homeward movement (a motion of return).

Figure 3:
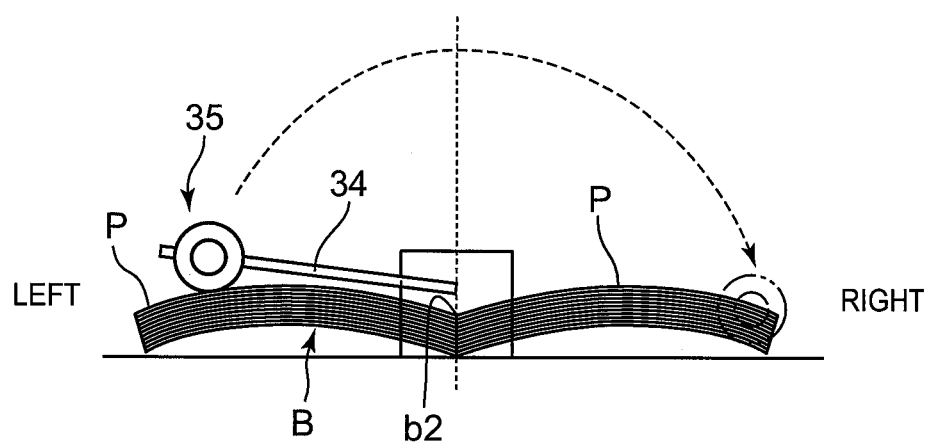
FIG. 3 is an elevation view showing a route of a sticking part provided on the top end of an arm part according to the embodiment.

FIG. 3 is an elevation view (viewed in a direction along an axis of the seam b2 of the pages P or viewed from a plane side, the normal line of which is parallel to the seam b2) showing a route of the sticking part 35 provided on the top end of the arm part 34. As shown in FIG. 3, in the outward movement, the sticking part 35 on the top end of the arm part 34 moves from a position which contacts the departure position of the pages P to the destination position of the pages P as if the sticking part 35 draws a circular arc over the pages P.

Figure 4A:
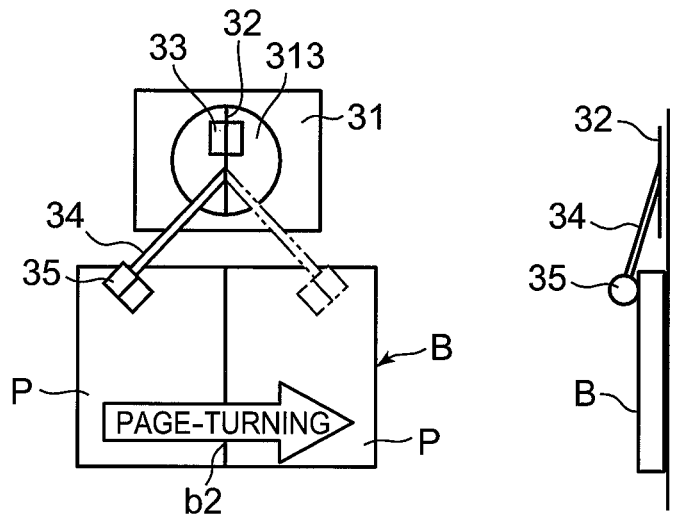
Figure 4B:
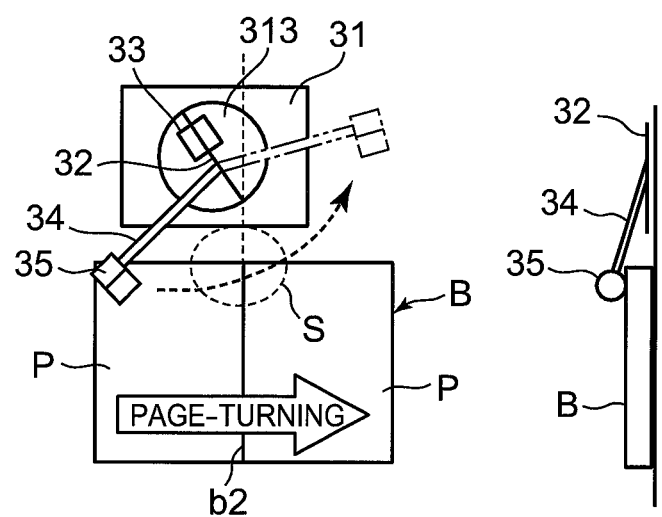
Figure 4C:
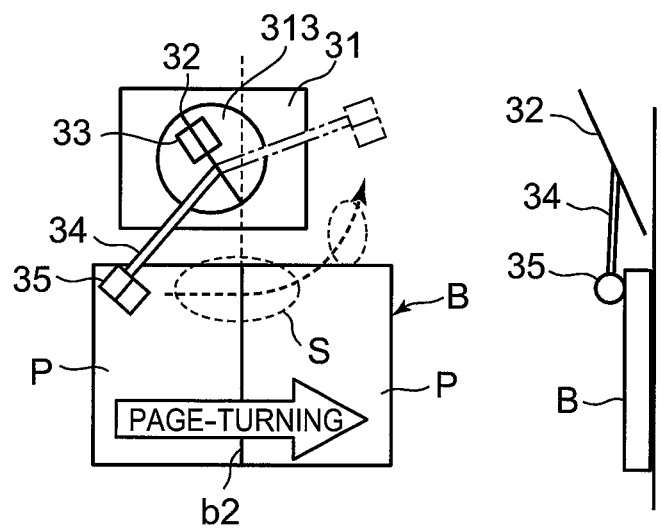

FIG. 4A, FIG. 4B and FIG. 4C schematically illustrate how the inclination of the drive shaft 32 affects the page-turning operation of the pages P. FIG. 4A illustrates a case where the drive shaft 32 is horizontally disposed on the extension of the seam b2. In this case, since the sticking part 35 moves along a route the symmetry axis of which corresponds to the seam b2, the sticking part 35 keeps in contact with the right-side page P at the destination position of the pages P without being able to separate from the page P.

FIG. 4B illustrates a case where the drive shaft 32 is horizontal and inclined such that the back end of the drive shaft 32 turns to right-hand side with respect to the seam b2 of the pages P and the front end of the drive shaft 32 as the base end turns to left-hand side with respect to the seam b2 of the pages P. In this case, after the sticking part 35 sticks to a page P at the departure position, the arm part 34 rotates around the drive shaft 32, and at the end point of the outward movement, the sticking part 35 separates from the book B forward. Therefore, the sticking part 35 can easily separate from the sticking page P.

In this case, however, the pages P cannot always be turned smoothly. One possible cause is that the distance between the book B and the sticking part 35 becomes long in the first phase to the middle phase (the ellipse S) of the page-turning operation.

FIG. 4C illustrates a case where the drive shaft 32 is inclined with respect to the seam b2 of the book B and is also inclined with respect to the horizontal plane, i.e. a case of the drive shaft 32 according to the embodiment. In this case, the distance between the book B and the sticking part 35 in the first phase to the middle phase (the ellipse S) of the page-turning is shorter than that in the case shown in FIG. 4B.

Figure 5A:
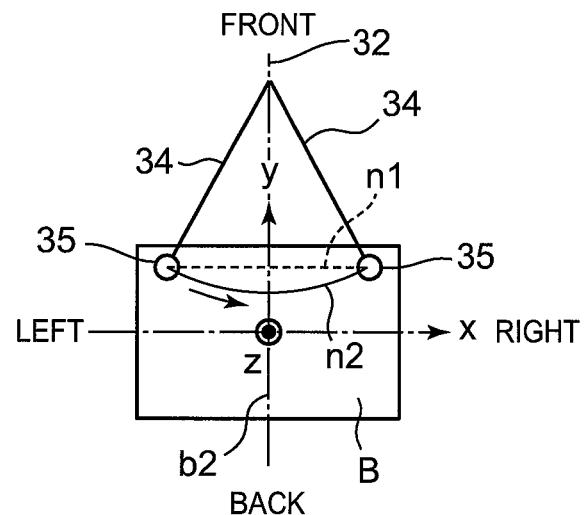
FIG. 5A is a top view schematically showing difference of routes of the sticking part between a case where the drive shaft of the first drive unit is horizontal and a case where the drive shaft is inclined with respect to the vertical line standing perpendicular to the seam.
Figure 5B:
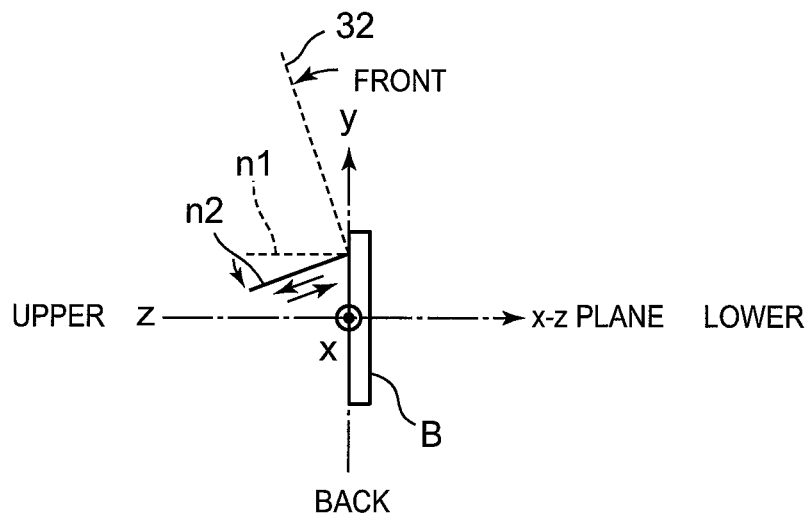
FIG. 5B is a side view schematically showing the difference of the routes of the sticking part between the case where the drive shaft of the first drive unit is horizontal and the case where the drive shaft is inclined with respect to the vertical line standing perpendicular to the seam.
Figure 5C:
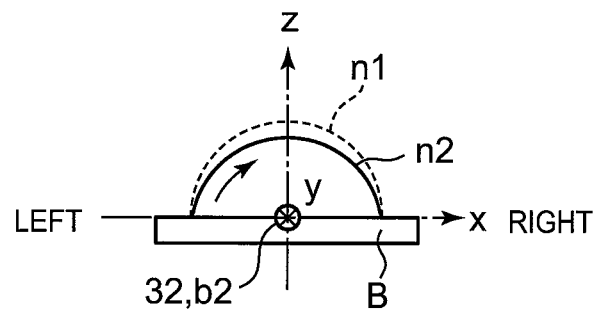
FIG. 5C is an elevation view schematically showing the difference of the routes of the sticking part between the case where the drive shaft of the first drive unit is horizontal and the case where the drive shaft is inclined with respect to the vertical line standing perpendicular to the seam.

To be more specific, FIG. 5A, FIG. 5B and FIG. 5C schematically illustrate difference of routes of the sticking part 35 between a case where the drive shaft 32 is horizontal and a case where the drive shaft 32 is inclined with respect to the horizontal plane, wherein FIG. 5A is a top view, FIG. 5B is a side view, and FIG. 5C is an elevation view. In FIG. 5A, FIG. 5B and FIG. 5C, the left-right direction, the up-down direction and the vertical direction of the book B are respectively defined as an x direction, a y direction and a z direction. In FIG. 5A, FIG. 5B and FIG. 5C, the drive shaft 32 aligns with the seam b2 of the book B in order to clarify the point that the drive shaft 32 of the embodiment is inclined with respect to the horizontal plane. As shown in FIG. 5A, FIG. 5B and FIG. 5C, in the case where the drive shaft 32 is horizontal (dot lines in the figures), the locus n1 of the sticking part 35 is a straight line along the left-right direction in the top view (FIG. 5A), a straight line along the vertical direction in the side view (FIG. 5B) and a semicircle in the elevation view (FIG. 5C). On the other hand, in the case where the drive shaft 32 is inclined with respect to the horizontal plane (solid lines in the figures), the locus n2 of the sticking part 35 is a circular arc being convex backward in the top view (FIG. 5A), a straight line with its upper end being inclined backward in the side view (FIG. 5B) and a deformed semicircle in the elevation view (FIG. 5C). The locus n2 in FIG. 5B shows the locus plane of the driven sticking part 35 viewed from the side. It shows that the locus n2 is inclined with respect to a plane (x-z plane) including the left-right direction of the book B and a normal line of the book B.

As is known from FIG. 5C, the distance from the sticking part 35 to the seam b2 when the sticking part 35 passes over the seam b2 is shorter than the distance from the sticking part 35 to the seam b2 when the sticking part 35 sticks to a page P at the departure position. That is to say, the locus n2 can make the distance from the book B to the sticking part 35 when the sticking part 35 passes over the seam b2 shorter than the locus n1.

Thus, according to the embodiment shown in FIG. 4C, in the second phase of the page-turning, the distance between the book B (the seam b2) and the sticking part 35 becomes long, so that the sticking part 35 can easily separate from the sticking page P. Also, in the first phase to the middle phase (the ellipse S) of the page-turning operation, the distance between the book B (the seam b2) and the sticking part 35 becomes short, so that a page P can be slackened appropriately. Therefore, the pages P can be reliably turned.

In the homeward movement, the moving direction is opposite to that in the outward movement, and the sticking part 35 takes the same route as that of the outward movement, moves keeping a distance from the pages P and, in the end, sticks to another page P at the departure position of the pages P. Repeating this shuttle operation progresses the page-turning operation of the pages P.

In the present embodiment, the drive shaft 32 is inclined with respect to the seam b2 of the opened book B and is also inclined with respect to the horizontal plane as shown in FIG. 4C as an example. It is needless to say that if the drive shaft 32 is inclined with respect to either the seam b2 or the horizontal plane, these cases have their respective effects.

If the drive shaft 32 is inclined only with respect to the horizontal plane, as described later, a second drive unit 37 is driven or the sticking part 35 is configured in such a way as to stay at a higher position on the right than that on the left so that the sticking part 35 can easily separate from a page P.

Figure 6:
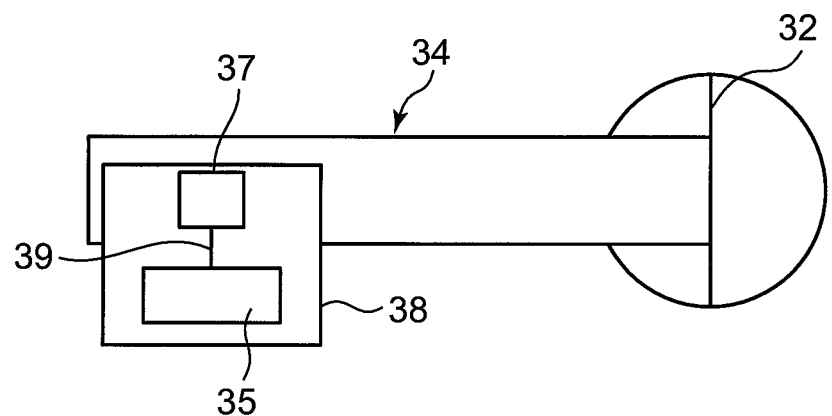
FIG. 6 is a schematic view schematically showing the configuration of the arm part according to the embodiment.

Next, specific configurations of the arm part 34 and the sticking part 35 will be explained. FIG. 6 is a schematic diagram schematically showing the configuration of the arm part 34. The arm part 34 is a plate component the base end of which is attached to the drive shaft 32 as shown in FIG. 6. The sticking part 35 is attached to the top end of the arm part 34 via the second drive unit 37 such as a motor. The second drive unit 37 and the sticking part 35 are covered with a cover 38.

The second drive unit 37 is disposed such that a drive shaft 39 of the second drive unit 37 is along a direction perpendicular to the longitudinal direction of the arm part 34. The sticking part 35 is removably attached to the drive shaft 39, and the sticking part 35 rotates as the drive shaft 39 rotates.

Figure 7:
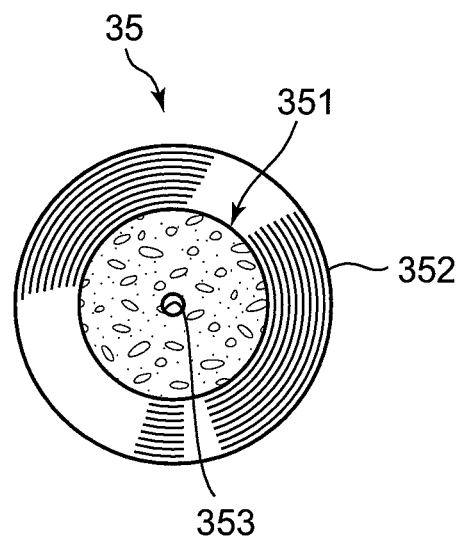
FIG. 7 is an elevation view schematically showing the configuration of the sticking part according to the embodiment.

FIG. 7 is an elevation view schematically showing the configuration of the sticking part 35. As shown in FIG. 7, the sticking part 35 includes a columnar rotating roller 351 and an adhesive component 352 wound around the rotating roller 351.

There has been desire to improve working efficiency in replacement of the sticking parts 35 with respect to the drive shaft 39 of the second drive unit 37. Hence, the rotating roller 351 is made of an elastic body such as a sponge, and a fit hole 353 into which the drive shaft 39 is fitted is formed at the center of the rotating roller 351. Other than the sponge, examples of the elastic body include rubber and foam. The inner diameter of the fit hole 353 is formed to be smaller than the outer diameter of the drive shaft 39. By pushing the drive shaft 39 into the fit hole 353, the rotating roller 351 contracts, and the drive shaft 39 fits in the fit hole 353. Consequently, at the replacement, the rotating roller 351 can be removed from the drive shaft 39 only by pulling the rotating roller 351 to be detached from the drive shaft 39. Thus, since the rotating roller 351 is elastic, the sticking part 35 can be easily put on and removed from the drive shaft 39, and accordingly the sticking part 35 can be easily replaced with another.

Figure 8:
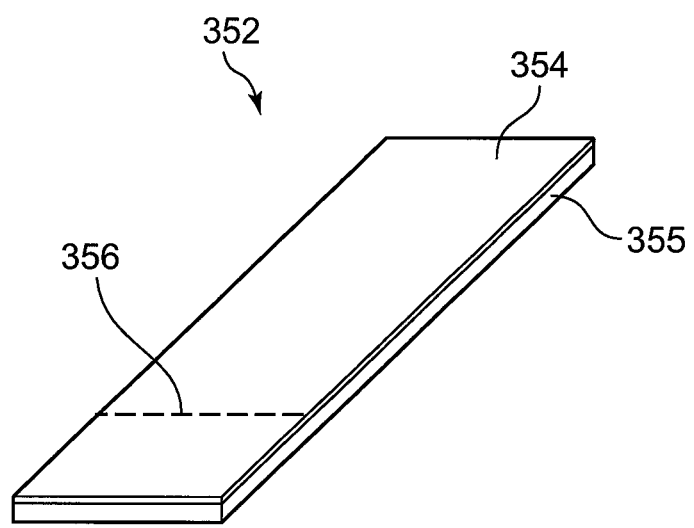
FIG. 8 is a perspective view schematically showing the structure of an adhesive component according to the embodiment.

FIG. 8 is a perspective view schematically showing the configuration of the adhesive component 352. As shown in FIG. 8, the adhesive component 352 is sheet-shaped and has, for example, a double-sided adhesive structure like a double-sided tape. The adhesive component 352 has a two-layer structure of a weak adhesive layer 354 and a strong adhesive layer 355. The weak adhesive layer 354 is provided on a side which sticks to the book B (surface side). The weak adhesive layer 354 has: weak adhesive power so that pieces of the weak adhesive layer 354 do not remain after the adhesive component 352 is removed; and a property that the weak adhesive layer 354 can be used multiple times. On the other hand, the strong adhesive layer 355 is provided on the opposite side. The strong adhesive layer 355 has adhesive power stronger than the weak adhesive layer 354 so that the strong adhesive layer 355 maintains a state of being wound around the rotating roller 351. Perforations 356 are formed at predetermined length intervals on the adhesive component 352.

Figure 9A:
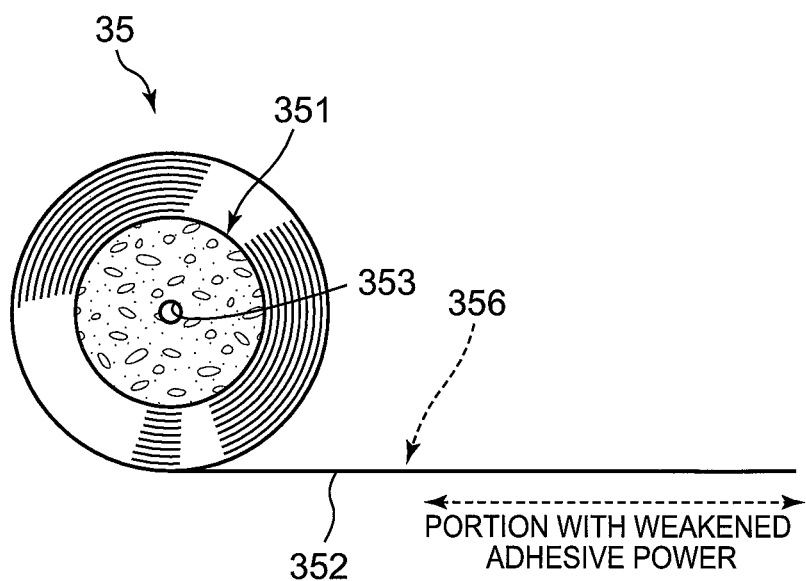
FIG. 9A illustrates the first step of a process of removing the adhesive component when the adhesive power has weakened.
Figure 9B:
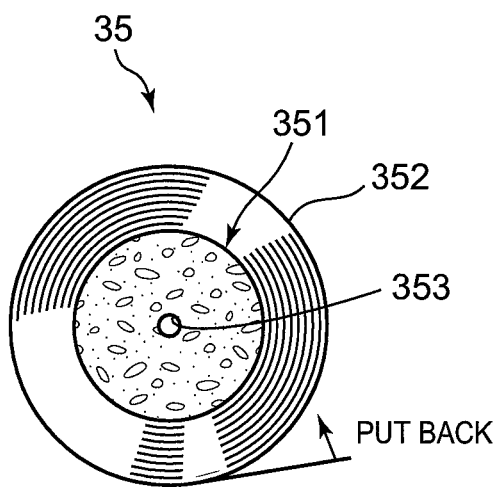
FIG. 9B illustrates the second step of the process of removing the adhesive component when the adhesive power has weakened.

FIG. 9A and FIG. 9B illustrate a process of removing the adhesive component 352 when the adhesive power has weakened. When a user feels that the adhesive power has weakened, the user removes the most outer surface of the adhesive component 352 by one round to expose a new portion of the weak adhesive layer 354 of the adhesive component 352 as shown in FIG. 9A. Then, the portion, the adhesive power of which has weakened, can be cut along the perforation 356. At the time of cutting, if a portion thereof temporarily peels off as shown in FIG. 9B, the user puts the portion back. Thus, a new portion of the weak adhesive layer 354 is exposed, so that the page-turning operation can be appropriately resumed.

Figure 10:
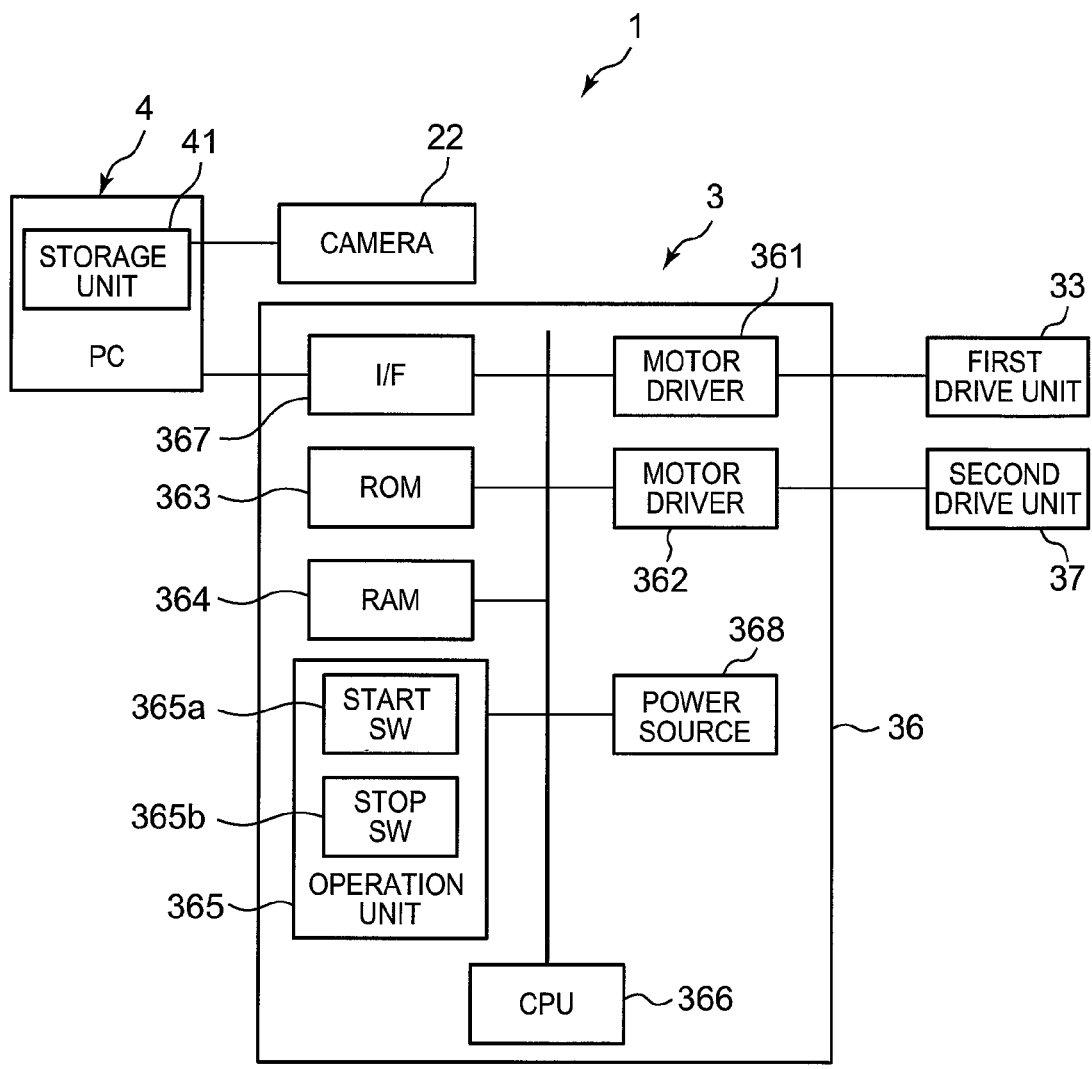
FIG. 10 is a block diagram showing the main control configuration of the document camera system according to the embodiment.

Next, the main control configuration of a document camera system 1 according to the embodiment will be explained. FIG. 10 is a block diagram showing the main control configuration of the document camera system 1. As shown in FIG. 10, the control unit 36 of the page-turning device 3 includes: a motor driver 361 which drives the first drive unit 33; a motor driver 362 which drives the second drive unit 37; a ROM 363 where a variety of programs are stored; a RAM 364 where the programs stored in the ROM 363 are opened when the programs are executed; an operation unit 365 where a variety of instructions are inputted; a CPU 366 which controls the motor drivers 361 and 362 by opening and executing the programs, which are stored in the ROM 363, in the RAM 364 on the basis of the instructions from the operation unit 365; an I/F 367 to which the computer 4 is connected; and a power source 368.

The operation unit 365 includes a start switch 365a for starting page-turning processing and a stop switch 365b for stopping the page-turning processing.

Figure 11:
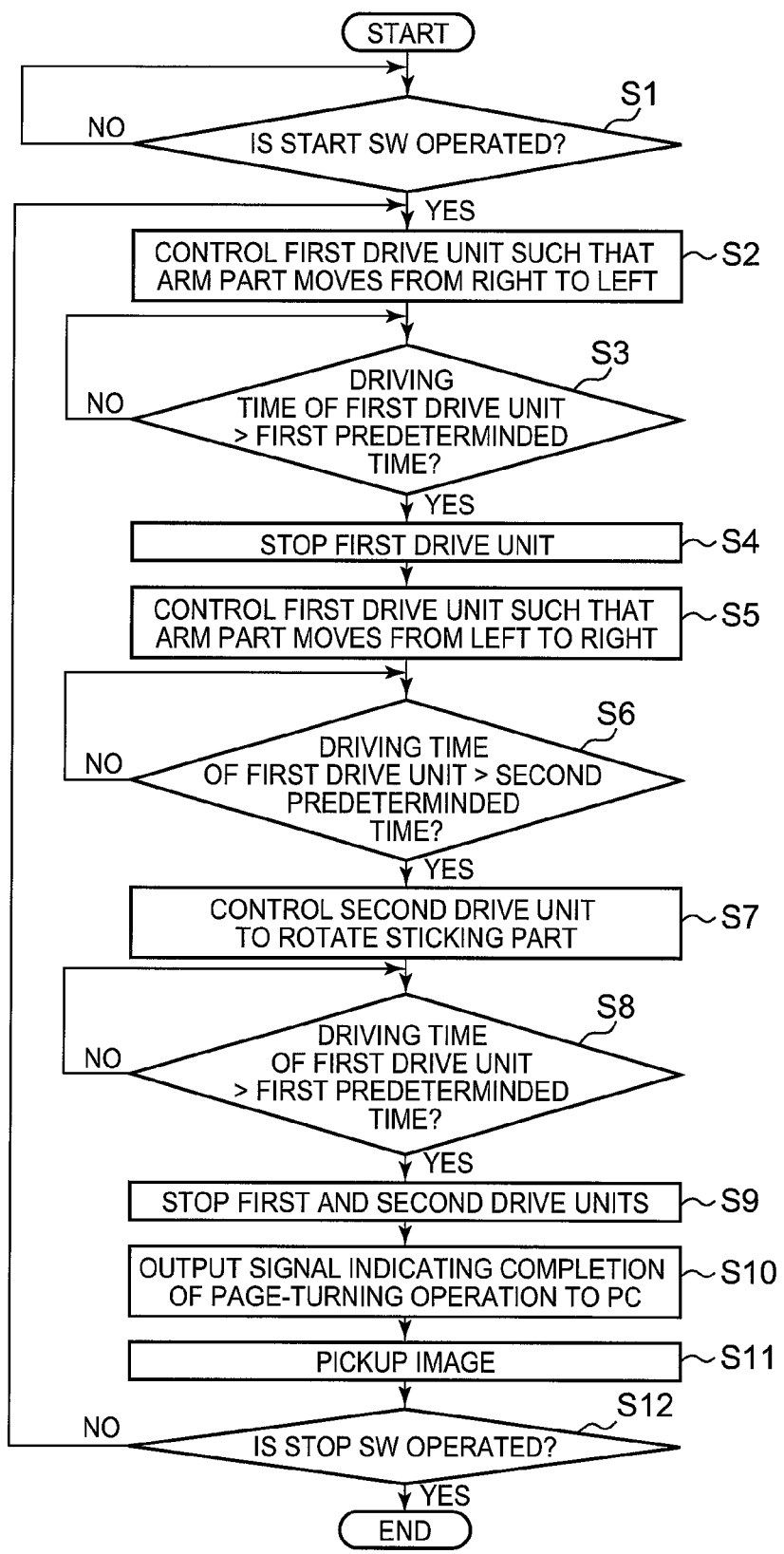
FIG. 11 is a flowchart of page-turning processing by the page-turning device of the embodiment.

The page-turning processing by the document camera system 1 will be explained hereinafter. FIG. 11 is a flowchart of the page-turning processing.

First, preparation before execution of the page-turning processing will be explained. In the page-turning device 3, the position of the arm part 34 is adjusted such that the sticking part 35 is disposed at the starting point (the end point of the homeward movement) in advance. At the time, a user checks the adhesive power of the adhesive component 352. If the adhesive power is weak, the user removes the weak portion to expose a new portion of the adhesive component 352. Then, the user opens the book B such that one page (one double-page spread) P before a page (a double-page spread) P from which the user would like to start image pickup is exposed and moves the sticking part 35 to the end point of the outward movement (the start point of the homeward movement). When the power source of the page-turning device 3 is turned on, the CPU 366 opens in the RAM 364 a program for the page-turning processing stored in the ROM 363 to execute the program.

As shown in FIG. 11, at Step S1, the CPU 366 determines whether or not the start switch 365a is operated. When determining that the start switch 365a is not operated, the CPU 366 keeps the state as it is. When determining that the start switch 365a is operated, the CPU 366 shifts the processing to Step S2.

At Step S2, the CPU 366 controls the first drive unit 33 such that the arm part 34 moves from right to left (homeward movement).

At Step S3, the CPU 366 determines whether or not a driving time of the first drive unit 33 exceeds a first predetermined time. When determining that the driving time does not exceed the first predetermined time, the CPU 366 keeps driving the first drive unit 33. When determining that the driving time exceeds the first predetermined time, the CPU 366 shifts the processing to Step S4. The first predetermined time is set at a time length enough for the arm part 34 to move from the start point to the end point of the homeward movement.

At Step S4, the CPU 366 stops the first drive unit 33. Thereby, the sticking part 35 sticks to a page P on the left with rotation of the sticking part 35 stopped.

At Step S5, the CPU 366 controls the first drive unit 33 such that the arm part 34 moves from left to right (outward movement).

At Step S6, the CPU 366 determines whether or not a driving time of the first drive unit 33 exceeds a second predetermined time. When determining that the driving time does not exceed the second predetermined time, the CPU 366 keeps driving the first drive unit 33. When determining that the driving time exceeds the second predetermined time, the CPU shifts the processing to Step S7. The second predetermined time is set at a time (time length) shorter than the first predetermined time. In particular, it is preferable that the second predetermined time be set at between a time length necessary for the arm part 34 to move from the start point to around the middle point of the outward movement and a time length necessary for the arm part 34 to move from the start point to almost the end point of the outward movement.

Figure 12:
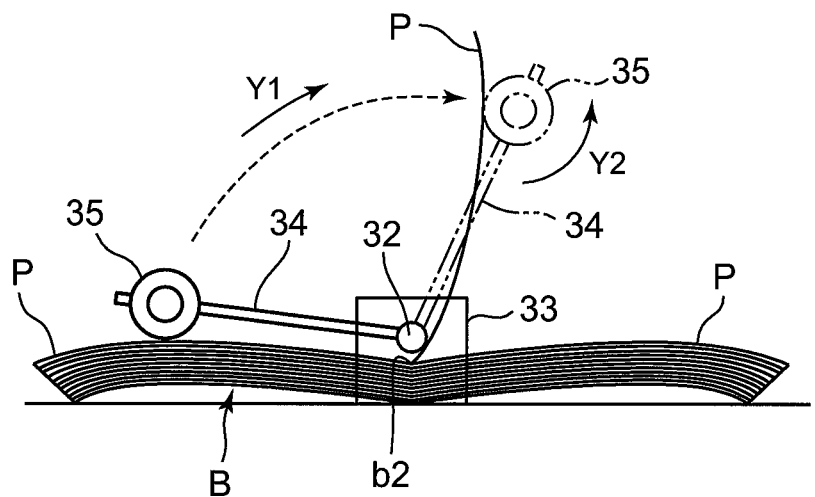
FIG. 12 is an elevation view showing a route and a rotating direction of the sticking part in an outward movement of the arm part according to the embodiment.

At Step S7, the CPU 366 controls the second drive unit 37 to rotate the sticking part 35 while keeping driving the first drive unit 33. This rotation changes the adhesive power of the sticking part 35 when the sticking part 35 separates from a page P, so that the sticking part 35 can reliably separate from the page P. As shown in FIG. 12, the arm part 34 rotates clockwise (arrow Y1) in the outward movement. In order to improve the separation performance, it is preferable that the second drive unit 37 rotate the sticking part 35 in a direction opposite to the swing direction of the arm part 34, i.e. counterclockwise.

At Step S8, the CPU 366 determines whether or not the driving time of the first drive unit 33 exceeds the first predetermined time. When determining that the driving time does not exceed the first predetermined time, the CPU 366 keeps driving the first drive unit 33 and the second drive unit 37. When determining that the driving time exceeds the first predetermined time, the CPU 366 shifts the processing to Step S9.

At Step S9, the CPU 366 stops the first drive unit 33 and the second drive unit 37. The sticking page P is separated from the sticking part 35 while the second drive unit 37 rotates. Thereby, the sticking part 35 is located at a position apart from the pages P of the destination position with no page P sticking thereto. The sticking part 35 and the arm part 34 at this position are outside the angle of view of the camera 22. (See FIG. 2A.)

Figure 13:
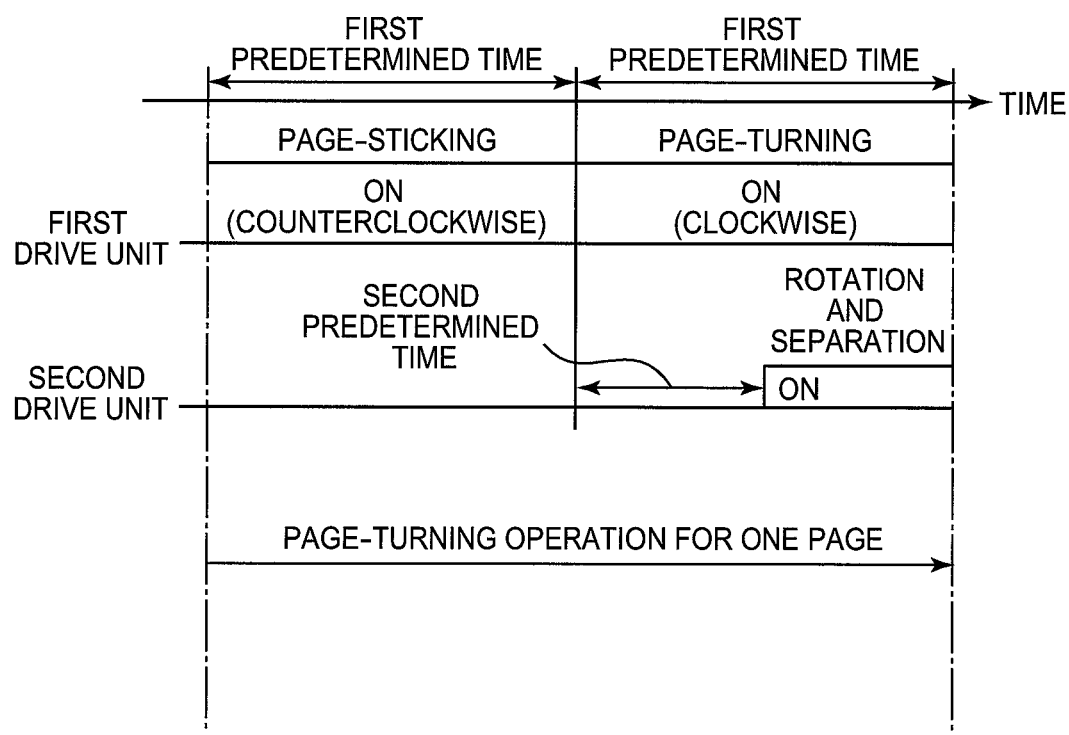
FIG. 13 is a timing chart showing drive timings of the first drive unit and the second drive unit in the page-turning operation for one page according to the embodiment.

FIG. 13 illustrates drive timings of the first drive unit 33 and the second drive unit 37 in the page-turning operation for one page.

In the embodiment, a drive end timing when the second drive unit 37 stops coincides with a drive end timing when the first drive unit 33 stops. However, the drive end timing when the second drive unit 37 stops may be earlier than the drive end timing when the first drive unit 33 stops.

At Step S10, the CPU 366 outputs a signal which indicates completion of the page-turning processing to the computer 4.

At Step S11, the computer 4 controls the camera 22 on the basis of the inputted signal which indicates completion of the page-turning operation so that the pages P opened at present (spread state) are imaged (image pickup). At the time, since the sticking part 35 and the arm part 34 are outside the angle of view of the camera 22, only the pages P opened at present are imaged. Picked-up image data generated by the camera 22 are numbered one by one and stored in a storage unit 41 of the computer 4.

At Step S12, the CPU 366 determines whether or not the stop switch 365b is operated. When determining that the stop switch 365b is not operated, the CPU 366 shifts the processing to Step S2. When determining that the stop switch 365b is operated, the CPU 366 ends the page-turning processing. In this way, the page-turning operation and the image pickup operation are alternately carried out, and image pickup of desired pages P is completed.

As described above, according to the embodiment, since the drive shaft 32 of the first drive unit 33 is inclined with respect to the seam b2 of the opened book B and/or the horizontal plane, sticking to a page P and separating from the page P with the sticking part 35 can be carried out at once only by driving the first drive unit 33 to swing the arm part 34. Therefore, separating a page from another of piled pages of a book and turning the separated page can be carried out in one operation, and accordingly the page-turning operation can be carried out at higher speed.

Further, in a view from above the book B, the position of the sticking part 35 when the sticking part 35 separates from the page P is more outside the book B than the position of the sticking part 35 when the sticking part 35 sticks to the page P. Thereby, in the second phase of the page-turning operation, the distance between the seam b2 and the sticking part 35 becomes long, so that the sticking part 35 can easily separate from a page P.

Further, the symmetry axis of swing of the arm part 34 is inclined with respect to the seam b2 of the book B such that the base end of the axis turns to the departure position side. Thereby, in the second phase of the page-turning operation, the distance between the seam b2 and the sticking part 35 becomes long, so that the sticking part 35 can easily separate from a page P.

Further, the distance from the sticking part 35 to the seam b2 when the sticking part 35 passes over the seam b2 is shorter than the distance from the sticking part 35 to the seam b2 when the sticking part 35 sticks to a page P at the departure position, so that the sticking part 35 gets close to the seam b2 on the way of the page-turning operation. Thereby, a page P can be appropriately slackened on the way of the page-turning operation, so that the page-turning operation can be smoothly carried out.

Further, the locus plane of the sticking part 35 driven by the first drive unit 33 is inclined with respect to the plane including the left-right direction of the book B and the normal line of the book B, so that the sticking part 35 gets close to the seam b2 on the way of the page-turning operation. Thereby, a page P can be appropriately slackened on the way of the page-turning operation, so that the page-turning operation can be smoothly carried out.

Further, since the sticking part 35 has the adhesive component 352 which adheres to a page P, the sticking part 35 can easily stick to a page P with a simple configuration.

Further, since the document camera system 1 with the camera 22 which images the pages P of the book B is provided with the page-turning device 3, the pages P can be reliably imaged while the pages P are automatically turned.

Further, since the arm part 34 is outside the angle of view of the camera 22 when the camera 22 images the pages P, the arm part 34 is prevented from getting into the images, so that appropriate images can be obtained.

Further, since the second drive unit 37 which rotates the sticking part 35 in relation to the arm part 34 is provided, the sticking part 35 can rotate with the second drive unit 37 being driven to separate from a page P. Accordingly, auxiliary power for the sticking part 35 to separate from a page P acts, so that the reliability of the page-turning operation of the pages P, including the separation operation of the pages P, is improved.

Further, since the sticking part 35 rotates such that the strength of sticking of the sticking part 35 changes when the sticking part 35 separates from a page P, the strength of sticking can be lower while the sticking part 35 rotates, so that the sticking part 35 can separate from a page P more reliably.

Further, since the sticking part 35 rotates in a direction opposite to the swing direction of the arm part 34 when the sticking part 35 separates from a page P, the strength of sticking can be reliably lower while the sticking part 35 rotates, so that the sticking part 35 can separate from a page P appropriately.

Further, since the sticking part 35 stops rotating when sticking to a page P, the strength of sticking of the sticking part 35 to a page P is most stable at the time, so that the sticking part 35 sticks to a page P reliably.

Further, since the adhesive component 352 is removably attached around the rotating roller 351, a user can replace the adhesive component 352 with another adhesive component 352 which has different adhesive power.

Further, since the rotating roller 351 is made of an elastic material, a user can easily put/remove the rotating roller 351 on/from the drive shaft 39 of the second drive unit 37. Thereby, a user can easily replace the sticking part 35 with another.

Further, since the adhesive component 352 has the double-sided adhesive structure, a user can easily wind the adhesive component 352 around the rotating roller 351. Also, the adhesive power of the outer circumference surface thereof can be effectively demonstrated owing to the structure.

Further, since the perforations 356 are formed at predetermined length intervals on the adhesive component 352 having the double-sided adhesive structure, a user can easily remove portions of the adhesive component 352 from the rotating roller 351 by using the perforations 356, so that the adhesive power of the sticking part 35 can be revived easily.

Further, since the sticking part 35 is attachable/detachable to/from the arm part 34, a user can easily replace the sticking part 35 with another which has different adhesive power or a different radius.

The invention is not limited to the above embodiment, and several modifications can be applied thereto appropriately.

For example, if the sticking part 35 makes one rotation when the sticking part 35 separates from a page P, the portion used in the previous sticking sticks to another/new page P in this-time sticking again. Hence, while the page-turning operation is repeated, only one specific portion sticks to the pages P, so that the adhesive power lowers faster. Therefore, it is preferable that the sticking part 35 rotate even a little before sticking to a page P. This changes the sticking position (portion) of the sticking part 35 to the pages P, so that the adhesive power can be kept for a long term.

Even if the sticking position is always the same, the sticking/separation can be repeated a predetermined number of times. Hence, for example, the number of times the page-turning operation is carried out is stored in the RAM 364 so that the number of times the page-turning operation is carried out is measured, and the CPU 366 drives the second drive unit 37 on the basis of the number of times measured. Thereby, the CPU 366 can execute the rotation for changing the sticking position on the basis of the number of times the page-turning operation is carried out. In this case, the RAM 364 functions as a measurement unit of the present invention.

It is also possible to check the number of times the sticking/separation can be repeated with the same sticking position in advance and to set the number thereof as a predetermined number of times beforehand. In this case, when the pages P are turned a predetermined number of times or more after the CPU 366 drives the second drive unit 37 to rotate the sticking part 35 for changing the sticking position, the CPU 366 executes the next rotation for changing the sticking position. Thereby, the adhesive power can be kept for a longer term.

In the above embodiment, the sticking part 35 has the adhesive component 352, and the sticking part 35 sticks to a page P by the adhesive power of the adhesive component 352. However, it is also possible that the sticking part 35 sticks to a page P by suction etc. In this case, for example, a communicating hole which communicates with an inner space of the sticking part 35 is formed on the circumference surface of the sticking part 35 so that the inner space of the sticking part 35 and a pump communicate with each other, and by driving the pump such that the inner space is under negative pressure, sucking power acts onto the communicating hole. Thereby, the sticking part 35 can stick to a page P by the suction power.

Other than suction and adhesion, sticking by electrostatic attraction can be applied to the sticking part 35.

Figure 14:
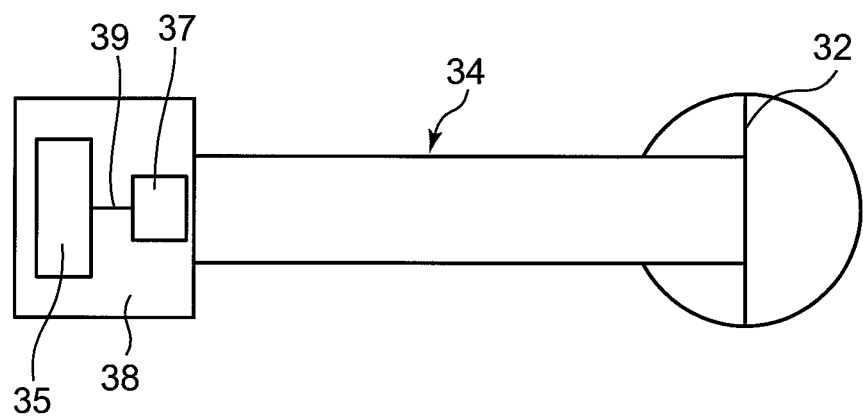
FIG. 14 is a schematic view showing a modification of the sticking part.

In the above embodiment, the drive shaft 39 of the second drive unit 37 is disposed along a direction perpendicular to the longitudinal direction of the arm part 34. However, as shown in FIG. 14, the second drive unit 37 may be disposed such that the drive shaft 39 is along the longitudinal direction of the arm part 34. In this case, the rotation axis of the sticking part 35 is also along the longitudinal direction, so that the arm part 34, the second drive unit 37 and the sticking part 35, as a whole, can be compact.

Though several embodiments of the present invention are illustrated, the scope of the invention is not limited to the above embodiments but includes the scope of claims attached below and the scope of their equivalents.

What is claimed is:

1. A page-turning device for turning a page of a book, said page-turning device comprising:
   an adhesive part which adheres to the page of the book being opened;
   an arm part with the adhesive part provided on a top end, the arm part swinging such that the adhesive part adheres to the page at a departure position of the page and separates from the page at a destination position of the page while the adhesive part goes to and fro between the departure position and the destination position over the page of the book; and
   a drive unit which rotates the adhesive part in relation to the arm part;
   wherein the drive unit stops rotation of the adhesive part when the adhesive part adheres to the page, and rotates the adhesive part such that an adhesive capacity of the adhesive part changes when the adhesive part separates from the page.

2. The page-turning device according to claim 1, wherein the drive unit rotates the adhesive part in a direction opposite to the rotating direction of the arm part's swing when the adhesive part separates from the page.

3. The page-turning device according to claim 1, wherein the drive unit rotates the adhesive part such that adhering positions of the adhesive part against one page and a next page are different.

4. The page-turning device according to claim 3, further comprising:
   a measuring component which measures a number of times of page-turning,
   wherein the drive unit rotates the adhesive part based on a measured number.

5. The page-turning device according to claim 4, wherein the drive unit rotates the adhesive part when the measured number is equal to or more than a predetermined number.

6. The page-turning device according to claim 1, wherein the adhesive part includes an adhesive component which adheres to the page.

7. The page-turning device according to claim 6, wherein the adhesive part includes a rotating roller around which the adhesive component is removably attached.

8. The page-turning device according to claim 7, wherein the rotating roller is formed from an elastic material.

9. The page-turning device according to claim 7, wherein the adhesive component has a double-sided adhesive constitution.

10. The page-turning device according to claim 7, wherein perforations are formed at predetermined intervals on the adhesive component.

11. The page-turning device according to claim 1, wherein the adhesive part is removably attached to the arm part.

12. The page-turning device according to claim 1, wherein a rotation axis of the adhesive part aligns with a longitudinal direction of the arm part.

13. The page-turning device according to claim 1, wherein the arm part makes the adhesive part adhere to a corner of a surface of the page at the departure position of the page.

14. A document camera system comprising:
   the page-turning device according to claim 1; and
   an image pickup unit which picks up an image of the page of the book.

15. The document camera system according to claim 14, wherein the arm part and the adhesive part are outside an angle of view of the image pickup unit when the image pickup unit picks up the image of the page.

16. A page-turning device for turning a page of a book, said page-turning device comprising:
   an adhesive part which adheres to the page of the book being opened;
   an arm part with the adhesive part provided on a top end, the arm part swinging such that the adhesive part adheres to the page at a departure position of the page and separates from the page at a destination position of the page while the adhesive part goes to and fro between the departure position and the destination position over the page of the book; and
   a drive unit which rotates the adhesive part in relation to the arm part;
   wherein the adhesive part includes an adhesive component which adheres to the page and a rotating roller around which the adhesive component is removably attached;
   wherein perforations are formed at predetermined intervals on the adhesive component.

17. A page-turning device for turning a page of a book, said page-turning device comprising:
   an adhesive part which adheres to the page of the book being opened;
   an arm part with the adhesive part provided on a top end, the arm part swinging such that the adhesive part adheres to the page at a departure position of the page and separates from the page at a destination position of the page while the adhesive part goes to and fro between the departure position and the destination position over the page of the book; and
   a drive unit which rotates the adhesive part relative to the arm part;
   wherein a rotation axis of the adhesive part aligns with a longitudinal direction of the arm part.

* * * * *